(12) United States Patent
Kotani

(10) Patent No.: US 9,082,330 B2
(45) Date of Patent: Jul. 14, 2015

(54) PROJECTION SYSTEM AND INFORMATION PROCESSING APPARATUS

(71) Applicant: CANON KABUSHIKI KAISHA, Tokyo (JP)

(72) Inventor: Junji Kotani, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 13/678,793

(22) Filed: Nov. 16, 2012

(65) Prior Publication Data

US 2013/0141475 A1 Jun. 6, 2013

(30) Foreign Application Priority Data

Dec. 2, 2011 (JP) ................................. 2011-265053

(51) Int. Cl.
  *G03B 21/26* (2006.01)
  *G09G 5/00* (2006.01)
  *H04N 9/31* (2006.01)

(52) U.S. Cl.
  CPC ............. *G09G 5/001* (2013.01); *H04N 9/3147* (2013.01)

(58) Field of Classification Search
  CPC . H04N 9/3147; H04N 9/3179; H04N 9/3197; H04N 5/64; H04N 5/74; G03B 21/14; G03B 21/26
  USPC ......... 353/30, 31, 69, 70, 94; 345/1, 1.3, 300, 345/428, 626; 348/739, 744–747
  See application file for complete search history.

(56) References Cited

U.S. PATENT DOCUMENTS

| 7,559,653 | B2* | 7/2009 | Silverstein ..................... 353/7 |
| 8,042,954 | B2* | 10/2011 | Tan et al. ..................... 353/94 |
| 8,251,512 | B2 | 8/2012 | Adkins et al. |
| 8,836,723 | B2* | 9/2014 | Tsao et al. ................... 345/633 |
| 2008/0259223 | A1 | 10/2008 | Read et al. |
| 2008/0266321 | A1* | 10/2008 | Aufranc et al. .............. 345/626 |
| 2009/0147004 | A1* | 6/2009 | Ramon et al. ................ 345/428 |
| 2011/0063518 | A1* | 3/2011 | Furui .......................... 348/687 |

FOREIGN PATENT DOCUMENTS

| CN | 1688160 A | 10/2005 |
| CN | 101015218 A | 8/2007 |
| CN | 101482690 A | 7/2009 |
| JP | 2010-134396 | 6/2010 |

OTHER PUBLICATIONS

The above foreign patent documents were a Apr. 3, 2015 Chinese Office Action, which is enclosed with an English Translation, that issued in Chinese Patent Application No. 201210520467.X.

(Continued)

*Primary Examiner* — Sultan Chowdhury
(74) *Attorney, Agent, or Firm* — Cowan, Liebowitz & Latman, P.C.

(57) ABSTRACT

An information processor receives, from each of a plurality of projectors, the number of pixels to be projected and the number of pixels of a region to be superposed of the projector, and the information processor calculates the number of pixels of an integrated image based on the number of pixels to be projected and the number of pixels of a region to be superposed of each projection screen of the projectors.

24 Claims, 15 Drawing Sheets

(56) References Cited

OTHER PUBLICATIONS

The above patent documents were cited Apr. 3, 2015 Chinese Office Action with an English Translation that issued in Chinese Patent Application No. 201210520467.X, which was uplaoded to the USPTO on Apr. 17, 2015.

* cited by examiner

F I G. 1A
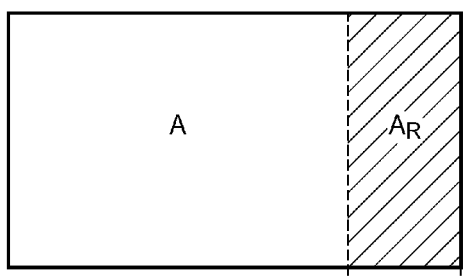
F I G. 1B
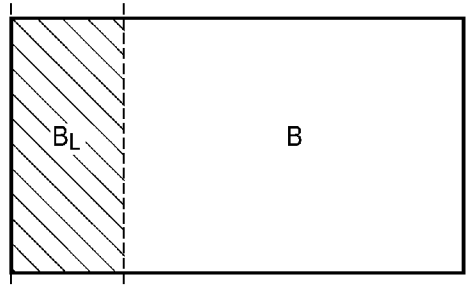
F I G. 1C
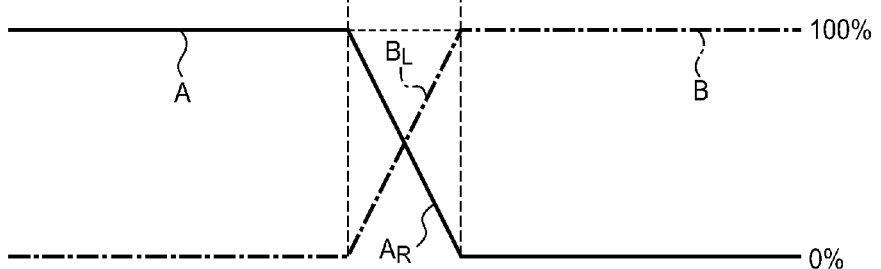

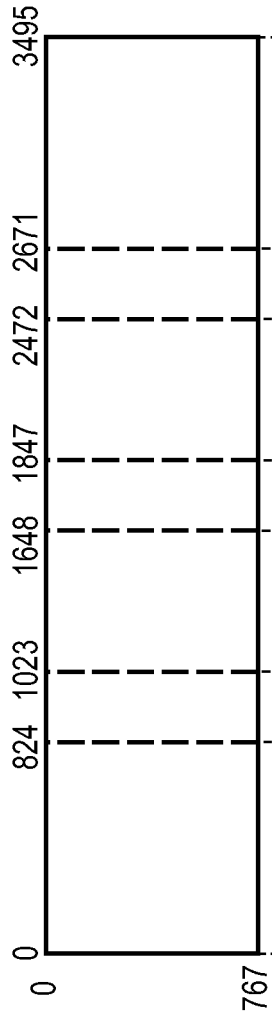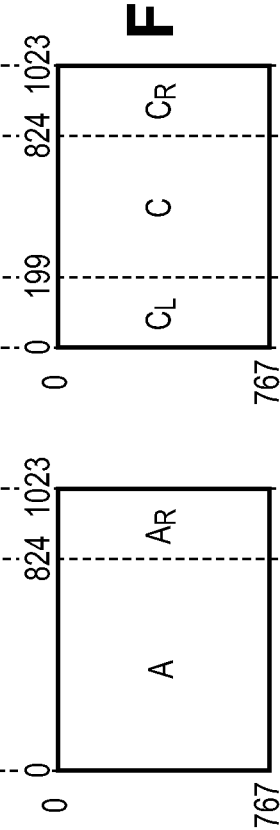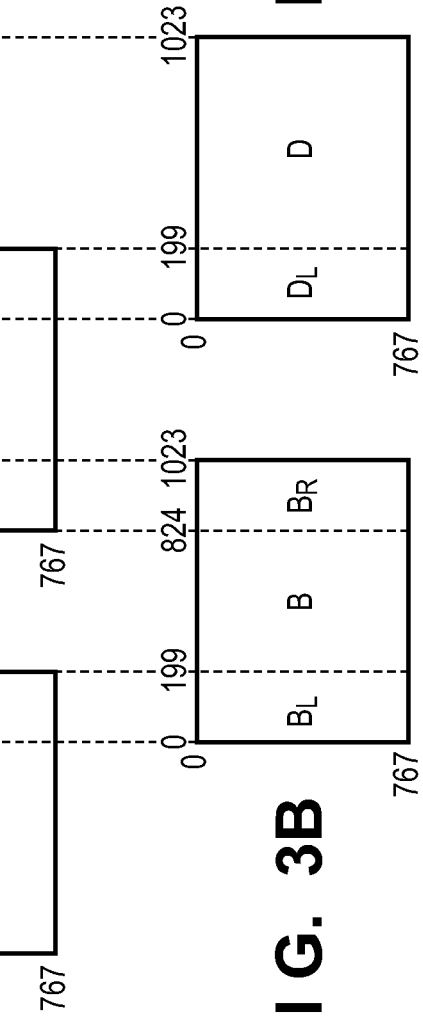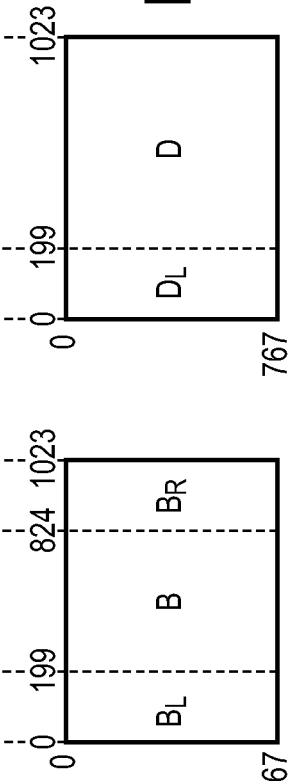

F I G. 7A

|  | a | b | c | d |
|---|---|---|---|---|
| NUMBER OF SCREENS OF MULTI PROJECTION(HORIZONTAL) | 4 | 4 | 4 | 4 |
| NUMBER OF SCREENS OF MULTI PROJECTION(VERTICAL) | 1 | 1 | 1 | 1 |
| POSITION OF PROJECTOR(HORIZONTAL) | 1 | 2 | 3 | 4 |
| POSITION OF PROJECTOR(VERTICAL) | 1 | 1 | 1 | 1 |
| EDGE BLEND WIDTH(LEFT) | 0 | 200(=$B_L$) | 200(=$C_L$) | 200(=$D_L$) |
| EDGE BLEND WIDTH(UPPER) | 0 | 0 | 0 | 0 |
| EDGE BLEND WIDTH(RIGHT) | 200(=$A_R$) | 200(=$B_R$) | 200(=$C_R$) | 0 |
| EDGE BLEND WIDTH(LOWER) | 0 | 0 | 0 | 0 |

F I G. 7B

|  | a | b | c | d |
|---|---|---|---|---|
| NUMBER OF SCREENS OF MULTI PROJECTION(HORIZONTAL) | 2 | 2 | 2 | 2 |
| NUMBER OF SCREENS OF MULTI PROJECTION(VERTICAL) | 2 | 2 | 2 | 2 |
| POSITION OF PROJECTOR(HORIZONTAL) | 1 | 2 | 1 | 2 |
| POSITION OF PROJECTOR(VERTICAL) | 1 | 1 | 2 | 2 |
| EDGE BLEND WIDTH(LEFT) | 0 | 200 | 0 | 200 |
| EDGE BLEND WIDTH(UPPER) | 0 | 0 | 200 | 200 |
| EDGE BLEND WIDTH(RIGHT) | 200 | 0 | 200 | 0 |
| EDGE BLEND WIDTH(LOWER) | 200 | 200 | 0 | 0 |

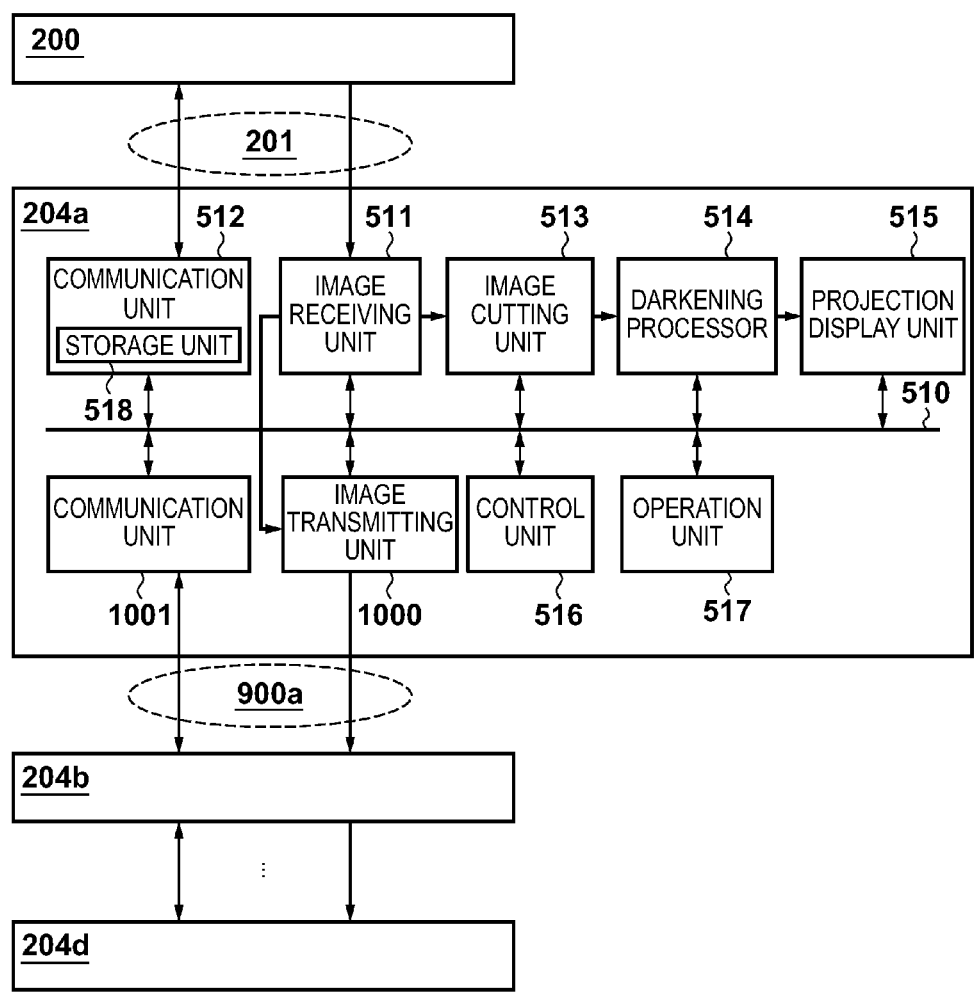
F I G. 10

PROJECTION SYSTEM AND INFORMATION PROCESSING APPARATUS

BACKGROUND OF THE INVENTION

1. Field of the Invention

The present invention relates to a projection system and information processing apparatus.

2. Description of the Related Art

Conventionally, a projector that projects an image generated by a light valve such as a liquid crystal panel onto a screen has been known as a projection apparatus. Recently, the resolution of images has been increased, and demands have arisen for displaying an image having a large number of pixels such as 4K2K or 8K4K onto a large screen. To increase the number of pixels of a projector or increase the screen size, it is generally necessary to downsize a light valve such as a liquid crystal panel or use a high-luminance light source, so the cost increases. Therefore, an image having a large number of pixels is often displayed on a large screen by multi projection using a plurality of inexpensive projectors each including an ordinary light valve or an ordinary light source.

Multi projection is a method of displaying one image as a whole by connecting a plurality of projected images. Note that one projected image (or projection screen) obtained by connecting a plurality of projected images (or projection screens) will be called "an integrated image (or integrated projection screen)" hereinafter for the sake of convenience. If a plurality of projected images are not strictly aligned when they are connected, joints are seen in an integrated image, and the image quality deteriorates. Accordingly, a process called edge blend that makes joints inconspicuous is performed. Edge blend is a process by which a plurality of projected images are partially superposed, and the superposed portion of each projected image is darkened such that the illuminance of the superposed portion is equal to that of an unsuperposed portion when the illuminances of the projected images are summed.

A practical example of edge blend will be explained with reference to FIGS. 1A to 1C. This is an example in which two projected images are connected in the horizontal direction by using two projectors. FIG. 1A shows a left projected image including two regions, that is, an unsuperposed region A and superposed region $A_R$. FIG. 1C shows the darkening process of edge blend. Referring to FIG. 1C, the horizontal direction of a projected image is the abscissa, and the ordinate represents the gain to an image in that position. The solid line in FIG. 1C is the gain to the left projected image. The gain is 100% in the unsuperposed region A, but gradually decreases to 0% (darkens) toward the image edge in the superposed region $A_R$. On the other hand, FIG. 1B shows a right projected image including two regions, that is, an unsuperposed region B and superposed region $B_L$. The alternate long and short dashed line in FIG. 1C is the gain to the right projected image. Similar to the gain on the left side, the gain is 100% in the unsuperposed region B, but gradually decreases to 0% (darkens) toward the image edge in the superposed region $B_L$.

In the edge blend process, the total gain of the regions $A_R$ and $B_L$ is set at 100% when the two regions are superposed. The dotted line in FIG. 1C indicates the total gain. Thus, an integrated image is formed by three regions, that is, the region A, the superposed region of the regions $A_R$ and $B_L$, and the region B, and a large image having a large number of pixels is projected by inputting corresponding partial images to two projectors. In addition, the gain gradually changes in the peripheries of the superposed regions $A_R$ and $B_L$. Even when a slight misalignment occurs in the projected image, therefore, the joint hardly becomes conspicuous. Although edge blend is performed by horizontally arranging two images in this example, it is naturally possible to arrange three or more images. In this case, projectors on the right and left ends perform the same processing as shown in FIGS. 1A to 1C, and another projector performs processing as shown in FIG. 1A or 1B on the right and left edges of one image. It is also possible to arrange images in the vertical direction, instead of the horizontal direction. In this case, the edge blend process as shown in FIGS. 1A to 1C is performed on the upper and lower edges in an image. Furthermore, when implementing multi projection by arranging a plurality of projectors in the vertical and horizontal directions, like 2×2 or 3×3, the edge blend process need only be performed on the upper and lower edges and right and left edges in an image.

A technique of projecting an image by performing the above-mentioned edge blend is described in, for example, Japanese Patent Laid-Open No. 2010-134396. Japanese Patent Laid-Open No. 2010-134396 describes a technique by which a PC generates a synthetic image by generating and adding an edge blended portion to an input image from a source device, transmits the synthetic image to projectors, and each projector cuts out a corresponding portion from the synthetic image and displays the partial image.

A projector using a light valve having a pixel structure desirably displays an input image from a source device without performing any scaling (resolution conversion), in order to improve the image quality. This is so because if scaling is performed, demerits of the image quality occur, for example, moire occurs, an information amount decreases, and high-frequency components are lost. To form an image on the entire surface of a light valve in order to display a large image, therefore, the number of pixels of an input image and that of the light valve are preferably equal.

On the other hand, when using a projector that performs edge blend, the size of a superposed region must be changeable by the user for the following reason. That is, when projected images can strictly be aligned, a large image can be displayed by downsizing or eliminating a superposed region. If strict alignment is difficult, however, it is necessary to enlarge a superposed region to make misalignment difficult to see. Accordingly, if the size of a superposed region is changeable when performing edge blend, the image quality often deteriorates because the number of pixels of an input image from a source device does not match that of an integrated image.

In above-mentioned Japanese Patent Laid-Open No. 2010-134396, when generating a synthetic image by generating and adding an edge blended portion to an input image from a source device, the resolution of the synthetic image is set to be an integral multiple of the resolution of a plurality of projectors as transmission sources. However, the deterioration of the image quality described above cannot be suppressed because the number of pixels (the resolution) of an input image from a source device is not taken into consideration. That is, depending on the number of pixels (the resolution) of an input image, scaling must be performed when generating an integrated image, and the image quality may deteriorate.

SUMMARY OF THE INVENTION

The present invention has been made in consideration of the aforementioned problems, and realizes a technique capable of suppressing the deterioration of the image quality by notifying a source device of the number of pixels of an integrated image by taking account of the number of pixels of a superposed region of each projected image, and inputting an image requiring no scaling.

In order to solve the aforementioned problems, the present invention provides a projection system comprising: a plurality of projectors; and an information processor, wherein the projection system displays an integrated image on a projection screen by partially superposing images projected by the plurality of projectors, wherein the information processor receives the number of pixels to be projected and the number of pixels of a region to be superposed from each of the plurality of projectors, and wherein the information processor calculates the number of pixels of the integrated image based on the number of pixels to be projected and the number of pixels of the region to be superposed of each projection screen of the projectors.

In order to solve the aforementioned problems, the present invention provides an information processing apparatus comprising: a communication unit configured to communicate with a plurality of projectors, wherein the plurality of projectors project an integrated image on a display screen by partially superposing projected images; and a calculation unit configured to calculate the number of pixels of the integrated image, wherein the communication unit receives the number of pixels to be projected and the number of pixels of a region to be superposed from each of the plurality of projectors, and wherein the calculation unit calculates the number of pixels of the integrated image based on the number of pixels to be projected and the number of pixels of the region to be superposed of each display screen of the projectors.

Further features of the present invention will become apparent from the following description of exemplary embodiments (with reference to the attached drawings).

BRIEF DESCRIPTION OF THE DRAWINGS

FIGS. 1A to 1C are views for explaining an edge blend process;

FIGS. 3A to 3E are exemplary views showing each projection screen and an integrated projection screen in the multi projection system;

FIGS. 7A and 7B are views for explaining multi projection information;

FIG. 10 is a block diagram of a projector of the second embodiment;

DESCRIPTION OF THE EMBODIMENTS

[First Embodiment]

An embodiment for practicing the present invention will be explained in detail below. Note that the embodiment to be explained below is an example for implementing the present invention and must appropriately be modified or changed in accordance with the arrangement of an apparatus to which the present invention is applied or with various conditions, so the present invention is not limited to the following embodiment. It is also possible to properly combine portions of embodiments to be described below.

A multi projection system including a projection apparatus to which the present invention is applied will be explained below. Also, the projection apparatus will be explained by taking a liquid crystal projector as an example. Note that the present invention is not limited to a liquid crystal projector, but applicable to any projection apparatus including a light valve having a pixel structure, for example, a DMD projector or laser projector. Furthermore, although a one-chip projector, three-chip projector, and the like are generally known as liquid crystal projectors, the present invention is applicable to any system.

<System Configuration> The overall configuration of a multi projection system of this embodiment will be explained below with reference to FIG. 2.

Figure 2:
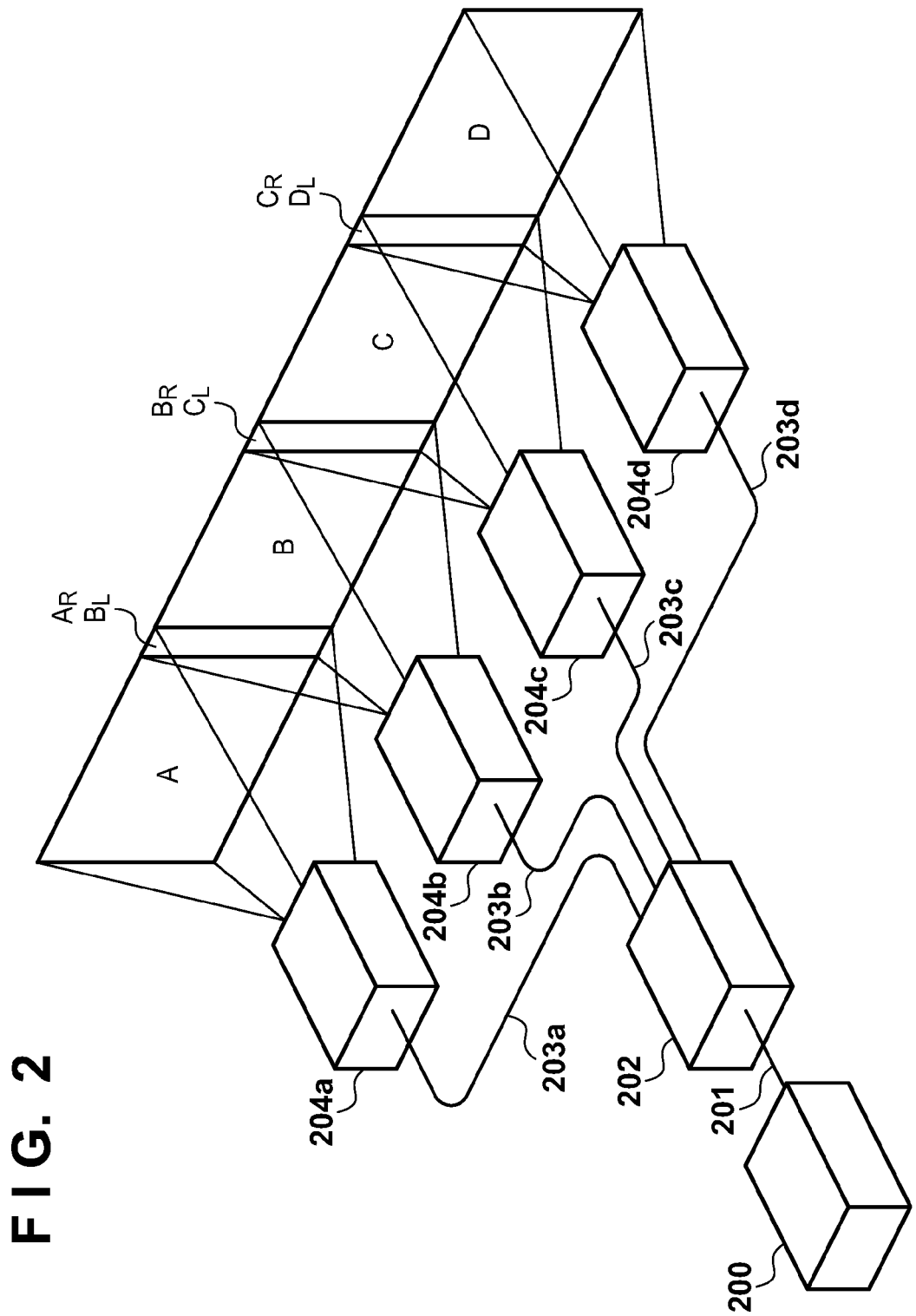
FIG. 2 is a perspective view showing a multi projection system of the first embodiment.

In FIG. 2, reference numeral 200 denotes a personal computer (to be referred to as a PC hereinafter). The PC 200 is an image supply source (source device) in this example. Note that the present invention can be practiced even when using another device as an image supply source. For example, a DVD player or TV tuner can be used. The PC 200 is connected to a distributor 202 (to be described later) by a cable 201, and transmits an image signal.

The distributor 202 is an example of an information processing apparatus to which the present invention is applicable. The distributor 202 is connected to projectors 204a to 204d (to be described later) by cables 203a to 203d, respectively. The distributor 202 receives an image signal from the PC 200, and distributes the received signal to the projectors 204a to 204d.

FIG. 3E shows the size of one frame of an image signal received from the PC 200. A solid-line rectangle indicates an image region of the image signal, numerical values shown above the rectangle indicate coordinates in the horizontal direction of the image region, and numerical values shown on the left side of the rectangle indicate coordinates in the vertical direction of the image region. In this example, the coordinates in the horizontal direction range from 0 to 3,495, and those in the vertical direction range from 0 to 767. Therefore, the size of one frame is 3,496 (horizontal)×768 (vertical).

The projectors 204a to 204d receive an image signal from the distributor 202, for example, the image signal shown in FIG. 3E. Each projector cuts out a corresponding portion from the image signal received from the distributor 202, and projects the cutout image. Each projector also performs an edge blend process on the image to be projected.

FIGS. 3A to 3D show projection screens of the projectors 204a to 204d, and FIG. 3E shows an integrated projection screen. Each projection screen has an edge blend superposed region having 200 pixels in the horizontal direction, as explained with reference to FIGS. 1A to 1C. The integrated projection screen is made up of the projection screen (including an unsuperposed region A and superposed region $A_R$) of the projector 204a, the projection screen (including an unsuperposed region B and superposed regions $B_L$ and $B_R$) of the projector 204b, the projection screen (including an unsuperposed region C and superposed regions $C_L$ and $C_R$) of the projector 204c, and the projection screen (including an unsuperposed region D and superposed region $D_L$) of the projector 204d.

Thus, the oblong image generated by the PC 200 can be displayed as one integrated image by the four projectors.

<Apparatus Configuration> Next, the arrangements of the PC, distributor, and projector forming the multi projection system will be explained with reference to FIGS. 4 and 5.

Figure 4:
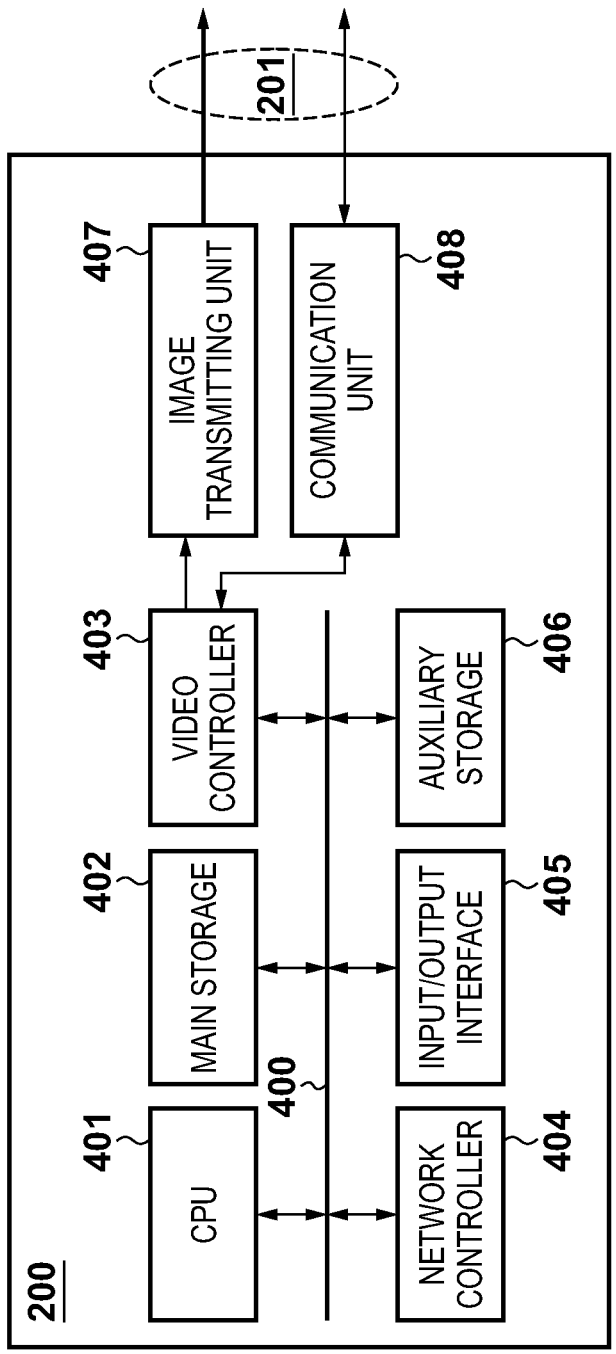
FIG. 4 is a block diagram of a PC.

FIG. 4 is a block diagram of the PC 200. In the PC 200, a CPU 401, main storage 402, video controller 403, network controller 404, input/output interface 405, and auxiliary storage 406 are connected to each other by a bus 400.

The CPU 401 comprehensively controls the individual blocks of the PC 200. Also, the CPU 401 operates in accordance with the codes of an operating system (to be referred to as an OS hereinafter) or applications stored in the auxiliary storage 406 or an external server (not shown). In accordance with the codes, the CPU 401 generates image data by controlling the video controller 403, and rasterizes the data on the main storage 402. Examples of the applications are presentation software, spreadsheet software, and video playback software. The CPU 401 can generate image data by generating a virtual desktop screen based on the number of pixels (to be described later), and arranging images corresponding to the above-mentioned software on the screen.

The main storage 402 is a work memory for the CPU 401 to operate.

The network controller 404 has a function of connecting the CPU 401 to an external server or network device (not shown).

The input/output interface 405 is an interface for connecting a device such as a keyboard or mouse (not shown) for the user to operate the PC 200.

The auxiliary storage 406 stores the OS and applications to be executed by the CPU 401 and data.

The video controller 403 generates image data under the control of the CPU 401. The video controller 403 is connected to an image transmitting unit 407. The image transmitting unit 407 has a function of receiving image data generated by the video controller 403, converts the received data into a format suitable for transmission to an external device, and transmitting the converted data. The video controller 403 is also connected to a communication unit 408. The communication unit 408 communicates with an external device as an image signal receiving side. The communication unit 408 can read out EDID (Extended Display Identification Data) whose format is standardized by the VESA (Video Electronics Standard Association) from the external device. The EDID indicates feature information of an image data receiving device, and stores, as one feature information, the number of image pixels optimum for the device. The video controller 403 receives the EDID acquired by the communication unit 408, and transmits the EDID to the CPU 401 through the bus 400.

Thus, the CPU 401 can acquire the optimum number of pixels of the external device as an image signal receiving side. For example, when the receiving device is an HDTV television set, the CPU 401 can acquire 1,920 pixels (horizontal)× 1,080 pixels (vertical) as the number of pixels. The CPU 401 generates the above-described virtual desktop screen by this number of pixels, thereby generating image data optimum for the image signal receiving device. The image transmitting unit 407 and communication unit 408 can be connected to the external device (in this example, the distributor 202) through the cable 201.

With this configuration, an optimum application or data can be installed in the auxiliary storage 406 of in an external server (not shown). Based on the application or data, therefore, the PC 200 generates an image such as a presentation image, an image indicating the result of a spreadsheet calculation, or a video image, and outputs the image to the external device.

Figure 5:
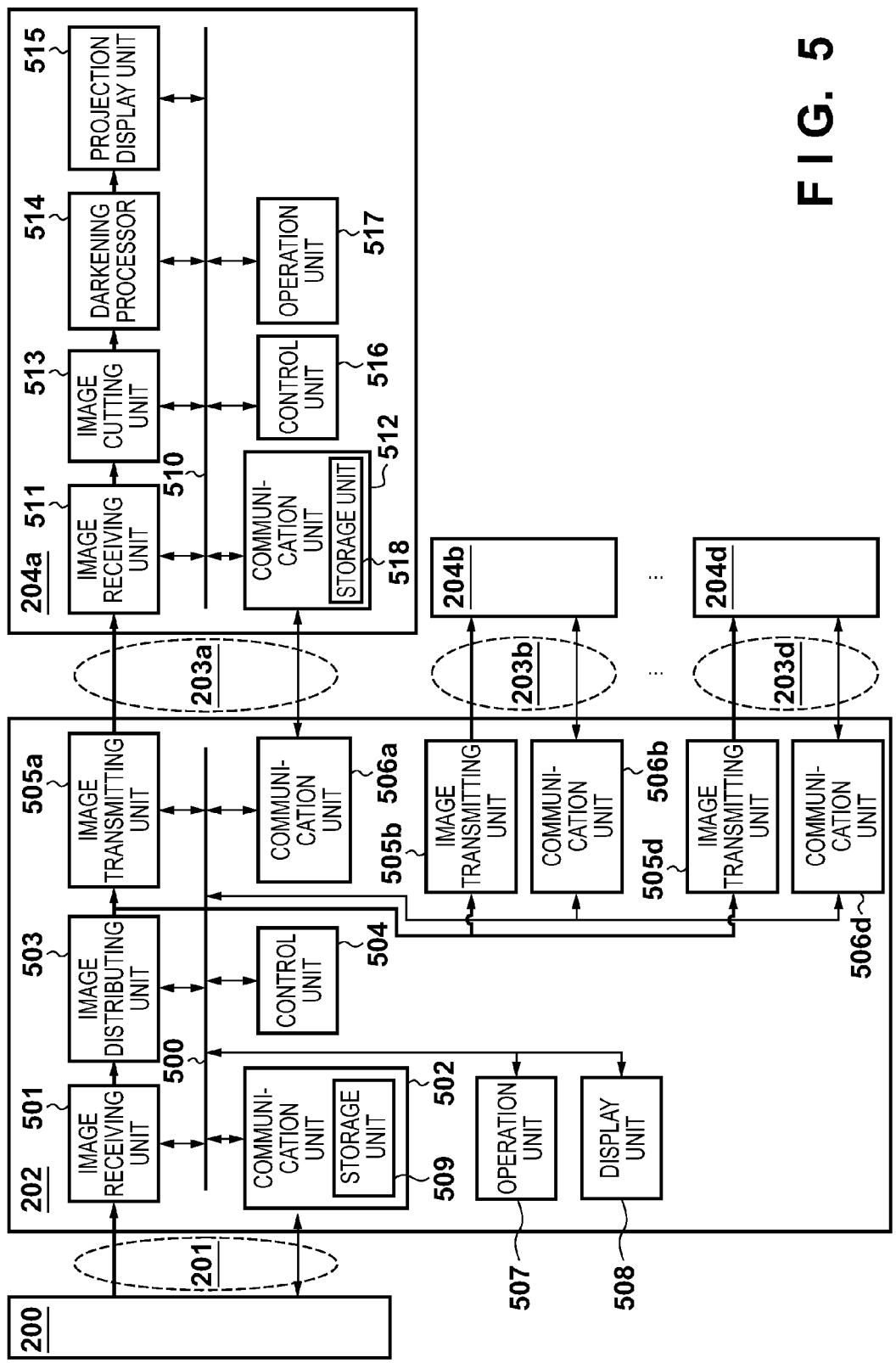
FIG. 5 is a block diagram of a distributor and projector of the first embodiment.

FIG. 5 is a block diagram of the distributor 202 and projectors 204a to 204d.

In the distributor 202 shown in FIG. 5, an image receiving unit 501, a communication unit 502, an image distributing unit 503, a control unit 504, image transmitting units 505a to 505d, communication units 506a to 506d, an operation unit 507, and a display unit 508 are connected to each other by a bus 500.

The control unit 504 comprehensively controls the individual blocks of the distributor 202. The control unit 504 reads out a code describing a procedure from a ROM (not shown), and executes the code by using a RAM (not shown) as a work memory.

The image receiving unit 501 is a circuit for receiving image data from a source device such as the PC 200. The image receiving unit 501 converts the image data having a format suitable for communication using the cable 201 into a format suitable for internal processing, and outputs the converted data to the image distributing unit 503.

The communication unit 502 is a circuit for communicating with a source device such as the PC 200. The communication unit 502 includes a storage unit 509 for storing EDID. The EDID indicates feature information of an image data receiving device, and stores, as one feature information, the number of image pixels optimum for the receiving device.

The image distributing unit 503 is a circuit for distributing the image data received by the image receiving unit 501 to a plurality of output destinations. In this example, the image distributing unit 503 distributes the same image data to the four circuits, that is, the image transmitting units 505a to 505d.

The image transmitting units 505a to 505d have a function of converting the image data received from the image distributing unit 503 into a format suited to transmission to an external device, and transmitting the converted data to the projectors 204a to 204d, respectively.

The communication units 506a to 506d are circuits for communicating with external display devices such as the projectors 204a to 204d, respectively.

The image transmitting units 505a to 505d and communication units 506a to 506d can be connected to external display devices such as the projectors 204a to 204d by the cables 203a to 203d, respectively.

The operation unit 507 is an operation member for the user to operate the distributor 202, and includes buttons, dials, and a light-receiving portion for receiving instructions from a remote controller (not shown). Information on instructions received by the operation unit 507 is transmitted to the control unit 504.

The display unit 508 presents the state of the distributor 202 to the user, and is an LED, liquid crystal display, or the like.

The arrangement of the projectors 204a to 204d will now be explained with reference to FIG. 5. Since the projectors 204a to 204d have the same arrangement, they will collectively be explained as a projector 204.

In the projector 204, an image receiving unit 511, communication unit 512, image cutting unit 513, darkening processor 514, projection display unit 515, control unit 516, and operation unit 517 are connected to each other by a bus 510.

The control unit 516 comprehensively controls the individual blocks of the projector 204. The control unit 516 reads out a code describing a procedure from a ROM (not shown), and executes the code by using a RAM (not shown) as a work memory.

The image receiving unit 511 receives image data from the distributor 202. The image receiving unit 511 converts the image data having a format suited to communication using the cable 203 into a format suitable for internal processing, and outputs the converted data to the image cutting unit 513.

The communication unit 512 communicates with an external device such as the distributor 202. The communication unit 512 includes a storage unit 518 for storing EDID. The EDID indicates feature information of the projector 204, and stores, as one feature information, the number of image pixels optimum for a projection screen of the projector 204. In an apparatus such as a projector that displays an image by using a light valve having a pixel structure, the number of image pixels herein mentioned is an effective number of pixels of the light valve (a liquid crystal panel). In this example, the number of pixels of the light valve of the projector 204 is 1,024×768, so the storage unit 518 stores this value.

The image cutting unit 513 is a circuit that cuts out a corresponding portion to be projected by the projector 204, from the image data received by the image receiving unit 511, and outputs the cutout data to the darkening processor 514 in the output stage.

FIG. 3E shows a cutting process. Assume that the image receiving unit 511 has received the oblong image shown in FIG. 3E. The control unit 516 designates a cut position to the image cutting unit 513. This designation is, for example, region information on a rectangle having upper left coordinates (0, 824) and lower right coordinates (767, 1847). The image cutting unit 513 receives this designation, and cuts out the image shown in FIG. 3B as a corresponding image from the image shown in FIG. 3E. The darkening processor 514 is a circuit that performs an edge blend darkening process on the image data received from the image cutting unit 513, and outputs the data to the projection display unit 515 in the output stage.

FIG. 3B shows the darkening process. The darkening processor 514 receives the image shown in FIG. 3B, and receives the designation of an edge blend region from the control unit 516. This designation is, for example, information containing the region $B_L$ (upper left coordinates (0,0)—lower right coordinates (199, 767)) on the left side in the darkening direction, and the region $B_R$ (upper left coordinates (824,0)—lower right coordinates (1023, 767)) on the right side in the darkening direction. The darkening processor 514 receives this designation, and performs the darkening process explained with reference to FIG. 1 on the image shown in FIG. 3E.

The projection display unit 515 projects input image data from the darkening processor 514. The projection display unit 515 includes a light source (not shown), liquid crystal panel (not shown), optical system (not shown), and liquid crystal panel driving circuit (not shown).

The operation unit 517 is an operation member for the user to operate the projector 204, and includes operation buttons and a light-receiving portion for receiving instructions from a remote controller (not shown). Information on instructions received by the operation unit 517 is transmitted to the control unit 516.

Figure 6A:
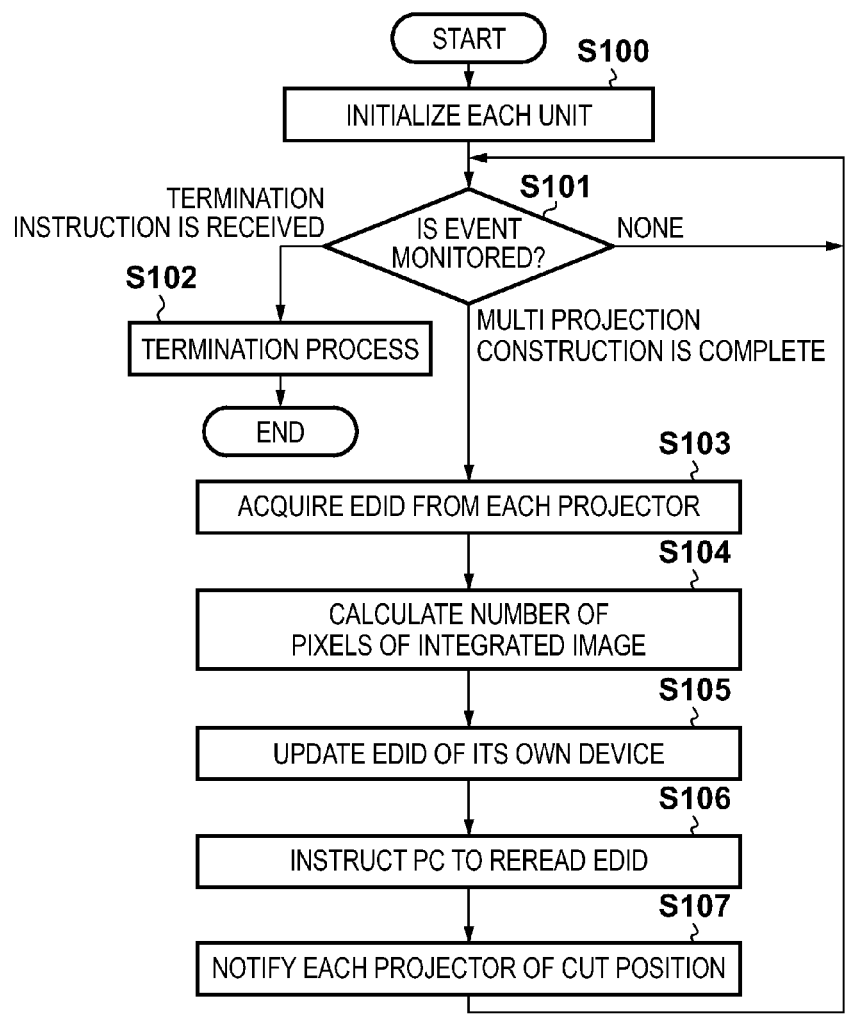
FIGS. 6A to 6C are flowcharts showing the operations of the PC, distributor, and projector of the first embodiment.
Figure 6B:
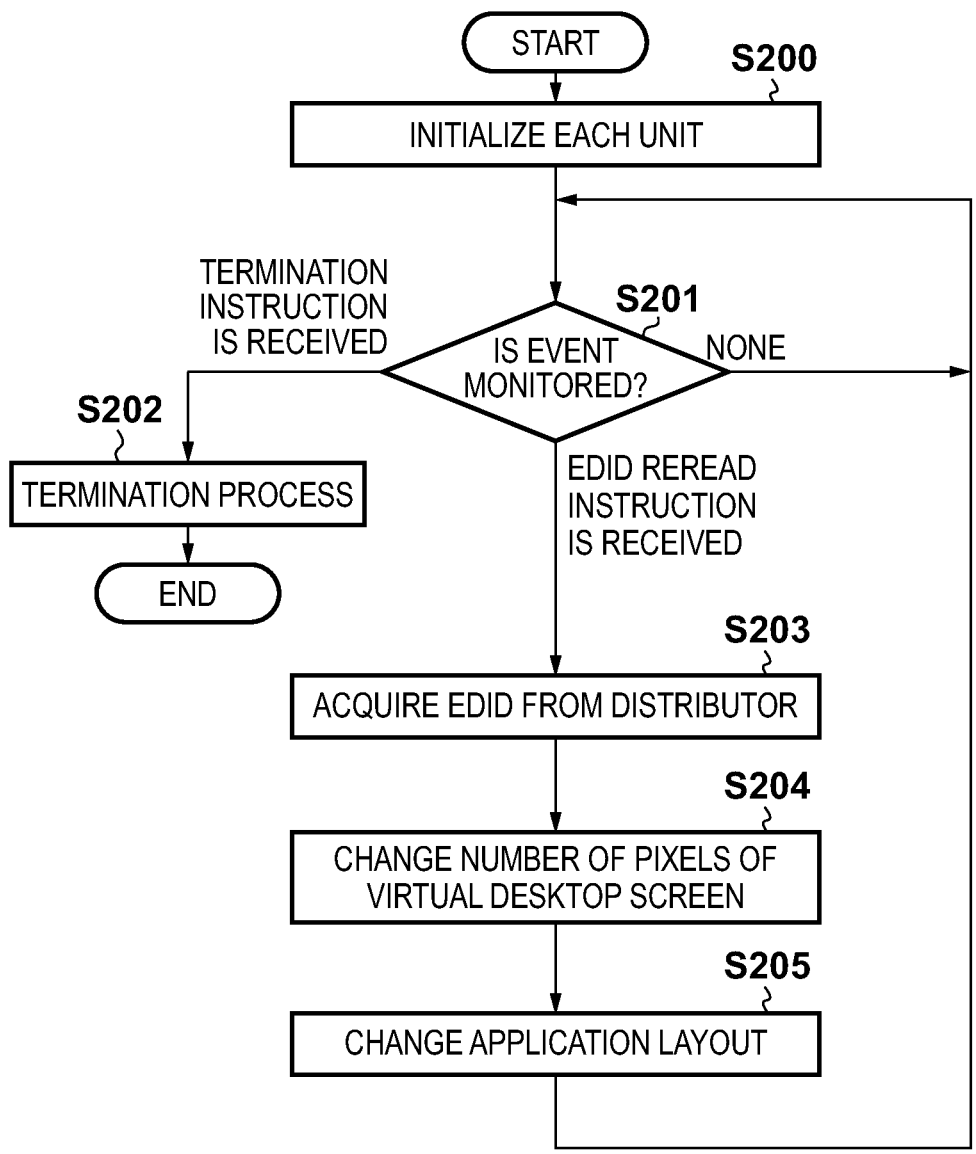
Figure 6C:
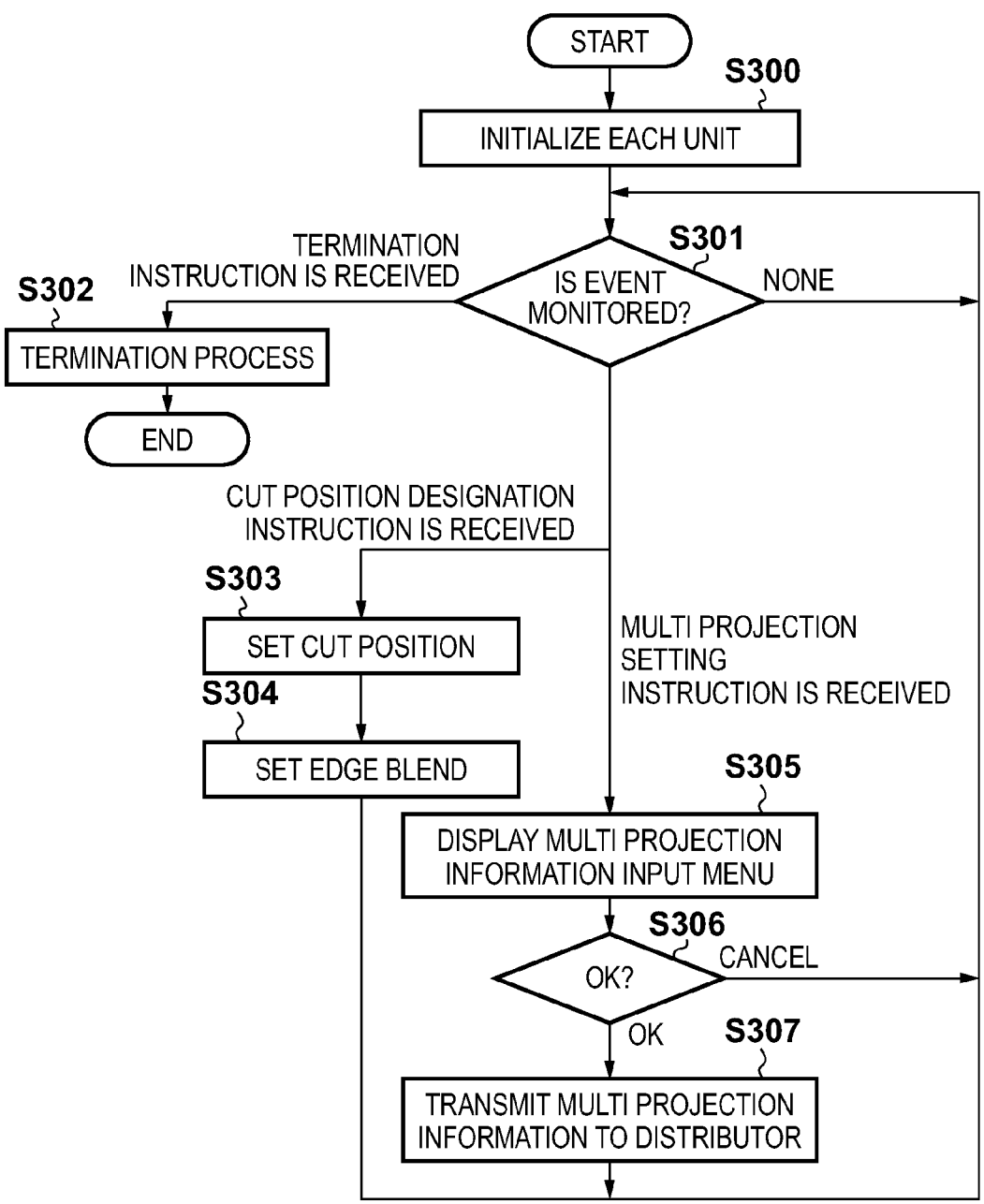

<Operation Explanation> Next, the operations of the PC 200, distributor 202, and projectors 204a to 204d will be explained with reference to FIGS. 6A to 6C. FIG. 6A shows the operation of the distributor 202. FIG. 6B shows the operation of the PC 200. FIG. 6C shows the operation of the projectors 204a to 204d.

(Operation of Distributor) First, the operation of the distributor 202 will be explained. Note that the process shown in FIG. 6A is implemented by the control unit 504 of the distributor 202 by reading out a code describing a procedure from a ROM (not shown), and executing the code by expanding it on a RAM (not shown) as a work memory.

Referring to FIG. 6A, when the user instructs the distributor 202 to turn on the power supply from the operation unit 507, the control unit 504 initializes each block in step S100. More specifically, the control unit 504 instructs a power supply unit (not shown) to supply power to each unit. Also, the control unit 504 reads out initial EDID prestored in the ROM (not shown), and writes the EDID in the storage unit 509. EDID normally stores information on the number of pixels optimum for the device, but the initial EDID of this example is not particularly limited. For example, the initial EDID can store the number of pixels such as 1,920 pixels (horizontal)×1,080 pixels (vertical).

Then, in step S101, the control unit 504 waits until an event occurs from one of the units of the distributor 202. If the control unit 504 determines that the user has instructed the distributor 202 to turn off the power supply from the operation unit 507, the process advances to step S102. Also, if multi projection information (to be described below) is received from all the projectors 204a to 204d as connection destinations via the communication units 506a to 506d, the control unit 504 determines that a multi projection system is constructed, and the process advances to step S103.

FIG. 7A shows an example of the multi projection information. Columns a to d respectively indicate information acquired from the projectors 204a to 204d. In this example, the number of screens of multi projection is 4 screens (horizontal)×1 screen (vertical), and the same information is described in the first and second rows of all the columns a to d. Also, in this example, the projector positions are arranged from the left in the order of the projectors 204a to 204d, and described in the third and fourth rows. Furthermore, the number of pixels of the edge blend width corresponding to each of the left, upper, right, and lower edges of each screen is described in the fifth to eighth rows. In this example, a superposed portion of each projection screen has 200 pixels. The superposed regions $A_R$, $B_L$, $B_R$, $C_L$, $C_R$, and $D_L$ shown in FIGS. 3A to 3D respectively correspond to portions denoted by the same reference symbols in FIG. 7A. A method of generating the multi projection information in the projectors 204a to 204d will be described later. Note that the multi projection information is not limited to the number of multi projection screens of 4 screens (horizontal)×1 screen (vertical), and may also be another number of screens. For example, if the number of screens is 2 screens (horizontal)×2 screens (vertical), multi projection information as shown in FIG. 7B need only be generated.

If the control unit 504 receives the power off instruction in step S101, the control unit 504 performs a process of terminating the distributor 202 in step S102. More specifically, the control unit 504 instructs the power supply unit (not shown) to stop supplying power to each unit.

If the control unit 504 determines in step S101 that the multi projection system is constructed, the process advances to step S103, and the control unit 504 reads out EDID from (the memories 518 of) the projections 204a to 204d as connection destinations via the communication units 506a to 506d. As described above, the EDID contains the number of image pixels optimum for the projection screen of each of the projectors 204a to 204d. In this example, the number of pixels is 1,024 pixels (horizontal)×768 pixels (vertical) as the number of pixels of the light valves of the projectors 204a to 204d.

In step S104, the control unit 504 calculates the number of pixels of an integrated image based on the optimum number of pixels of each projector obtained in step S103 and the multi projection information of each projector received in step S101. This calculation is performed by a method by which (1) the optimum numbers of pixels of the projectors are added up, and (2) the number of pixels of each superposed portion is subtracted from the total number of pixels, in the horizontal and vertical directions of multi projection. In this example, the following calculation is performed in the horizontal direction.

(1) 1,024 pixels (a)+1,024 pixels (b)+1,024 pixels (c)+1,024 pixels (d)=4,096 pixels
(2) 4,096 pixels−200 pixels (superposed portion between a and b)-200 pixels (superposed portion between b and c)-200 pixels (superposed portion between c and d)=3,496 pixels In this example, no superposed portion exists in the vertical direction, so 768 pixels as the number of pixels in the vertical direction common to the projectors 204a to 204d is directly obtained. In this example as described above, a size of 3,496 pixels (horizontal)×768 pixels (vertical) is obtained as the number of pixels of the integrated image. FIGS. 3A to 3E show the relationship between the integrated image and each projection screen of the individual projectors. Note that the present invention is naturally applicable to another layout. For example, when multi projection is 2 screens (horizontal)×2 screens (vertical) as shown in FIG. 7B, the number of pixels in the horizontal direction is as follows.

(1) 1,024 pixels (common to a and c)+1,024 pixels (common to b and d)=2,048 pixels
(2) 2,048 pixels−200 pixels (superposed portions between a and b, and c and d)=1,848 pixels The number of pixels in the vertical direction is as follows.
(1) 768 pixels (common to a and b)+768 pixels (common to c and d)=1,536 pixels
(2) 1,536 pixels−200 pixels (superposed portions between a and c, and b and d)=1,336 pixels In step S105, the control unit 504 overwrites the number of pixels of the integrated image calculated in step S104, on the information of the optimum number of pixels of the device contained in the EDID stored in the storage unit 509, and writes the EDID in the storage unit 509 again.

In step S106, the control unit 504 instructs the PC 200 to read out the EDID again via the communication unit 502. In response to this instruction, the PC 200 inputs an image signal corresponding to the number of pixels of the integrated image as will be described later. The input image signal is transmitted to the projectors 204a to 204d via the image transmitting units 505a to 505d as described previously.

In step S107, the control unit 504 calculates portions corresponding to the projections 204a to 204d in the integrated image by using the multi projection information shown in FIG. 7A, and notifies each projector of the result. More specifically, as shown in FIG. 3E, the control unit 504 notifies the projector 204a of upper left coordinates (0,0)—lower right coordinates (1023, 767) of the integrated image (integrated projection screen), the projector 204b of upper left coordinates (824,0)-lower right coordinates (1847, 767) of the integrated image (integrated projection screen), the projector 204c of upper left coordinates (1648,0)—lower right coordinates (2671, 767) of the integrated image (integrated projection screen), and the projector 204d of upper left coordinates (2472,0)—lower right coordinates (3495, 767) of the integrated image (integrated projection screen). After that, the process returns to step S101.

(Operation of PC) Next, the operation of the PC 200 shown in FIG. 6B will be explained. Note that the process shown in FIG. 6B is implemented by the CPU 401 of the PC 200 by reading out a code describing a procedure from a ROM (not shown), and executing the code by expanding it on a RAM (not shown) as a work memory.

Referring to FIG. 6B, when the user instructs the PC 200 to turn on the power supply by using a power button (not shown), the CPU 401 initializes each block in step S200. More specifically, the CPU 401 instructs a power supply unit (not shown) to supply power to each unit. Also, the CPU 401 loads the OS from the auxiliary storage 406, and initializes peripheral devices. In addition, the CPU 401 determines the size of a virtual desktop screen and generates an image based on EDID acquired from the communication unit 408 as described previously.

Then, in step S201, the CPU 401 waits until an event occurs from one of the units of the PC 200. Note that although the PC 200 normally executes a plurality of processes almost simultaneously by multitasking, only processes related to image output will be extracted and explained below. If the CPU 401 determines that the user has instructed the PC 200 to turn off the power supply from the power button (not shown) or a device such as a mouse (not shown) connected to the input/output interface 405, the process advances to step S202. If an instruction to read out the above-described EDID again from the distributor 202 as a connection destination is received from the communication unit 408, the process advances to step S203.

If the CPU 401 receives the power-off instruction in step S201, the CPU 401 performs a process of terminating the PC 200 in step S202. More specifically, the control unit 504 performs a process of shutting down the OS, and instructs the power supply unit (not shown) to stop supplying power to each unit.

In step S203, the CPU 401 reads out the EDID again from the distributor 202 via the communication unit 408. As described earlier, the number of pixels of the integrated image is described in the readout EDID.

In step S204, the CPU 401 changes the number of pixels of the virtual desktop screen based on the number of pixels of the integrated image contained in the readout EDID. More specifically, the CPU 401 changes the size of the virtual desktop screen to 3,496 pixels (horizontal)×768 pixels (vertical).

In step S205, the CPU 401 changes the layout of images of applications existing on the virtual desktop screen. Assume that the number of pixels of the unchanged virtual desktop screen is 1,920 pixels (horizontal)×1,080 pixels (vertical), and spreadsheet software is displayed on the full screen. In this case, to change the number of pixels of the virtual desktop screen to 3,496 pixels (horizontal)×768 pixels (vertical), it is only necessary to increase the number of display cells in the horizontal direction and reduce that in the vertical direction. After that, the process returns to step S201.

(Operation of Projector) The operation of the projectors 204a to 204d will be explained below with reference to FIG. 6C. Note that the projectors 204a to 204d equally operate, and hence will collectively be explained as a projector 204. The process shown in FIG. 6C is implemented by the control unit 516 of the projector 204 by reading out a code describing a procedure from a ROM (not shown), and executing the code by expanding it on a RAM (not shown) as a work memory.

Referring to FIG. 6C, when the user instructs the projector 204 to turn on the power supply from the operation unit 517, the control unit 516 initializes each block in step S300. More specifically, the control unit 516 instructs a power supply unit (not shown) to supply power to each unit. Also, the control unit 516 instructs the power supply unit to supply power to a lamp (not shown), and the projector 204 starts projecting an input image. Note that if there is no input image signal, the control unit 516 instructs a liquid crystal driving circuit (not shown) to display a blueback image or a warning indicating the absence of an input signal.

Then, in step S301, the control unit 516 waits until an event occurs from one of the units of the projector 204. If the control unit 516 determines that the user has instructed the projector 204 to turn off the power supply from the operation unit 517, the process advances to step S302. Also, if the distributor 202 as a connection destination instructs the projector 204 to set the above-described cut position from the communication unit 512, the process advances to step S303. Furthermore, if the user instructs the projector 204 to set multi projection from the operation unit 517, the process advances to step S305.

If the control unit 516 receives the power-off instruction in step S301, the control unit 516 performs a process of terminating the projector 204 in step S302. More specifically, the control unit 516 instructs the power supply unit (not shown) to stop supplying power to each unit. Also, the control unit 516 instructs the power supply unit (not shown) to stop supplying power to the lamp (not shown), thereby terminating projection display.

If the control unit 516 is instructed to set the cut position in step S301, the control unit 516 sets the designated cut position in the image cutting unit 513 in step S303. When taking the projector 204b as an example, as explained in step S107, an image of upper left coordinates (824,0)—lower right coordinates (1847, 767) can be cut out from the integrated image having 3,496 pixels (horizontal)×768 pixels (vertical).

In step S304, the control unit 516 instructs the darkening processor 514 to perform an edge blend process, based on multi projection information input from the user as will be described later. Consequently, the edge blend process is performed on the cutout image, and then the image is projected. After that, the process returns to step S301.

If the control unit 516 is instructed to set multi projection in step S301, the process advances to step S305, and the control unit 516 accepts multi projection detail information input from the user. More specifically, the control unit 516 instructs the liquid crystal driving circuit (not shown) to project a menu image as shown in FIG. 8, thereby allowing the user to input various kinds of detail information by using the operation unit 517.

Figure 8:
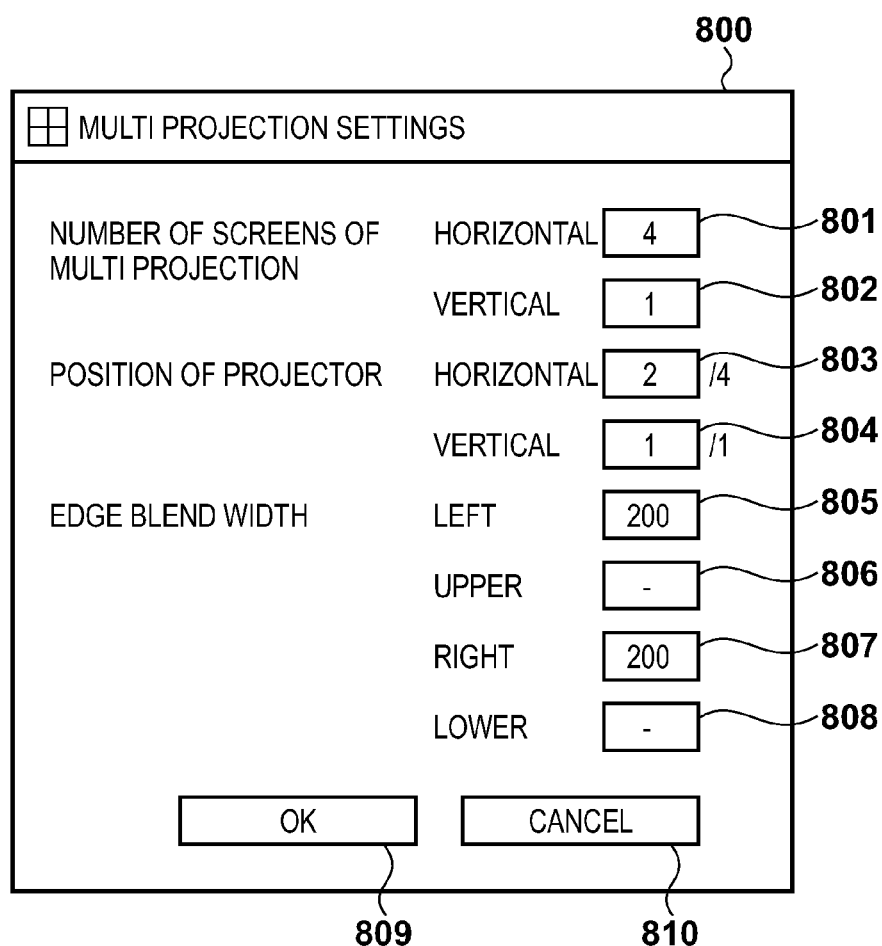
FIG. 8 is an exemplary view showing a multi projection information setting screen.

FIG. 8 explains the menu image.

Reference numeral 800 denotes the menu image. The menu image 800 contains a plurality of setting items as follows.

A setting item 801 is a setting item for the user to input the number of horizontal screens of multi projection. In this example, 4 (screens) is input.

A setting item 802 is a setting item for the user to input the number of vertical screens of multi projection. In this example, 1 (screen) is input.

A setting item 803 is a setting item for the user to input the horizontal position of the projector, among the layout information of multi projection. In this example, 2 (the second screen) (of 4 screens) is input.

A setting item 804 is a setting item for the user to input the vertical position of the projector. In this example, 1 (the first screen) (of 1 screen) is input.

A setting item 805 is a setting item for the user to input an edge blend width with respect to the left edge of the projection screen of the projector. In this example, 200 (pixels) is input.

A setting item 806 is a setting item for the user to input an edge blend width with respect to the upper edge of the projection screen of the projector. In this example, input to this field is invalidated (this is equivalent to 0 pixel as a value). This is so because the control unit 516 determines that no edge blend process is necessary in the vertical direction because multi projection is performed in the horizontal direction, and displays the menu that way.

A setting item 807 is a setting item for the user to input an edge blend width with respect to the right edge of the projection screen of the projector. In this example, 200 (pixels) is input.

A setting item 808 is a setting item for the user to input an edge blend width with respect to the lower edge of the projection screen of the projector. In this example, input to this field is invalidated (this is equivalent to 0 pixel as a value). This is so because the control unit 516 determines that no edge blend process is necessary in the vertical direction because multi projection is performed in the horizontal direction, and displays the menu that way.

An OK button 809 is an item for the user to determine the above-mentioned input numerical values.

A cancel button 810 is an item for the user to cancel the above-mentioned input numerical values.

If the control unit 516 determines in step S306 that the user has selected the cancel button 810, the process returns to step S301. If the control unit 516 determines in step S306 that the user has selected the OK button 809, the process advances to step S307. After the determination in step S306, the display of the menu image 800 is erased regardless of the selected button.

In step S307, the control unit 516 changes the multi projection setting information input by the user in step S305 into the format shown in FIG. 7A, and notifies the distributor 202 of the format via the communication unit 512.

In this embodiment as has been explained above, the distributor 202 can acquire the number-of-pixel information of the projectors 204a to 204d and the multi projection information set by the user. In addition, the distributor 202 can calculate the number of pixels of the integrated image from these pieces of information, reflect the calculation result on EDID, and notify the PC 200 as a source device of the EDID. Consequently, the PC 200 can generate a virtual desktop screen by using the number of pixels of the integrated image, and input an image signal to the distributor 202. Also, the distributor 202 can distribute the image signal to the projectors 204a to 204d, and notify each projector of a corresponding portion of the image.

In the multi projection system of this embodiment, therefore, even when the setting of the multi projection information such as the layout position or edge blend width is changed, the number of pixels of an image signal output from the PC 200 can follow the change. This makes it possible to generate and display an integrated image (by the number of pixels of the light valve) without performing any scaling in the projectors 204a to 204d.

Note that this embodiment has the arrangement in which the distributor 202 distributes the image signal of an integrated image to the projectors 204a to 204d without processing the signal, and each projector cuts out and displays a corresponding portion. However, the present invention can also be practiced by another arrangement. An example is an arrangement in which the distributor 202 cuts out corresponding portions of the projectors 204a to 204d from the integrated image, and outputs the respective corresponding portions to the projectors 204a to 204d. This arrangement can be implemented as follows. First, the image distributing unit 503 is given a function of cutting out arbitrary partial images from an image signal, and individually outputting the cutout partial images to the image transmitting units 505a to 505d. In addition, step S107 is changed such that the image distributing unit 503 is notified of the cut positions, and a full image is designated as a cut position for each of the projectors 204a to 204d (that is, practically no cutting is performed).

Also, the multi projection information is input from the projectors 204a to 204d in this embodiment, but the information may be input from the distributor 202. In this case, step S101 is changed such that instead of acquiring the multi projection information from the projector 204, the display unit 508 displays the menu image 800, and the user inputs the multi projection information by using the operation unit 507. Furthermore, the control unit 504 notifies the projector 204 of the edge blend width in addition to the normal operation in step S107, so that the control unit 516 can set the edge blend width in the darkening processor 514 of the projector 204 in step S304.

Although the edge blend width is designated by pixels in this embodiment, but the present invention is not limited to this. For example, the edge blend width can also be designated by the ratio to the number of pixels of the light valve of the projector, instead of pixels. In this case, the number of pixels of the edge blend width is obtained by multiplying the number of pixels of the light valve by the ratio. Therefore, this can be practiced by using the arrangement and procedure explained in this embodiment.

Also, this embodiment is explained by taking the distributor as an example, but the present invention is not limited to the distributor. That is, the present invention is applicable to any apparatus as long as the apparatus includes an image signal input unit and image signal output unit. Examples are a DVD recorder, AV amplifier, PC, and smartphone.

As described above, in a projection system that performs edge blend, a source device is notified of the number of pixels of an integrated image by taking account of the number of pixels of a superposed region, and an image requiring no scaling is input. This makes it possible to suppress the deterioration of the image quality.

[Second Embodiment]

A multi projection system of the second embodiment will be explained below. Note that in the following description, an explanation of the same features as those of the first embodiment will be simplified, and differences will mainly be explained.

Figure 9:
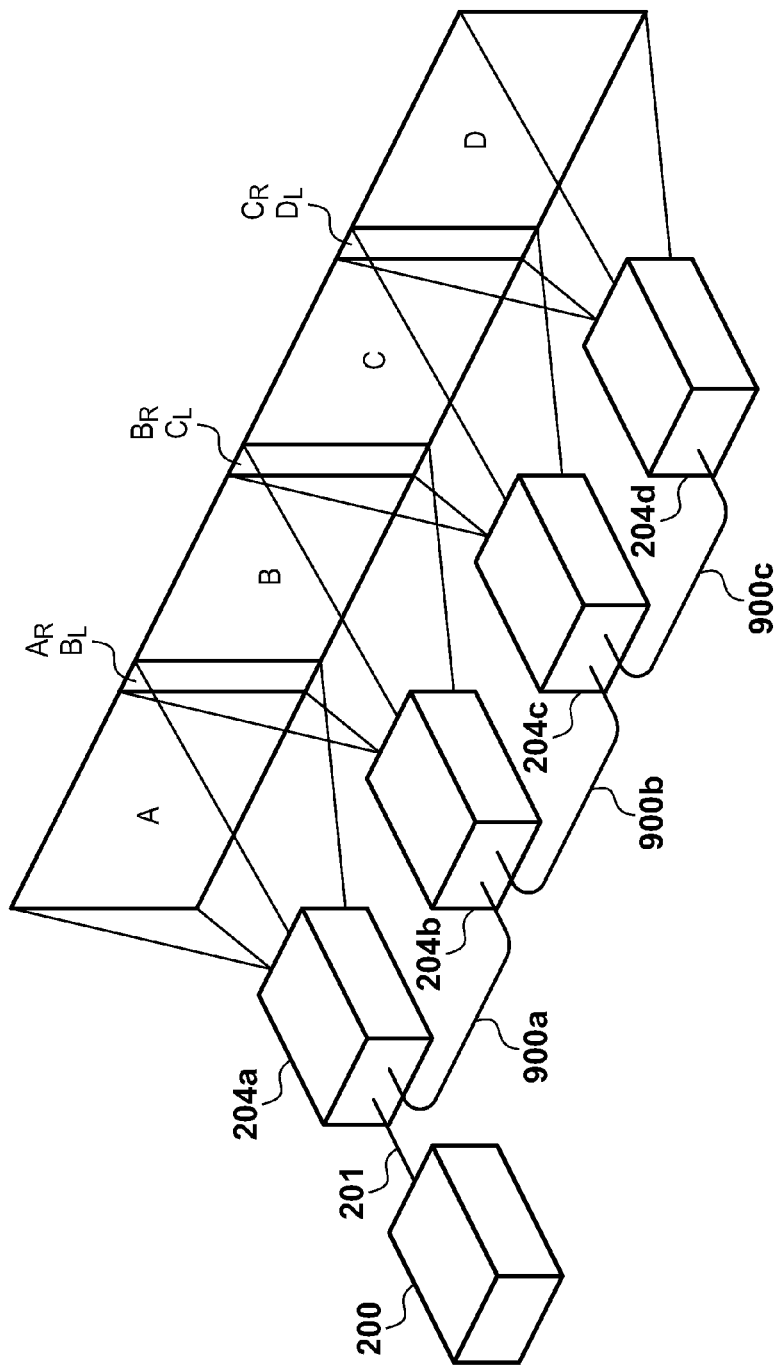
FIG. 9 is a perspective view of a multi projection system of the second embodiment.

<System Configuration> FIG. 9 shows the configuration of the multi projection system of this embodiment, in which the same reference numerals as in the first embodiment denote the same elements.

In the multi projection system of this embodiment, projectors 204a to 204d are connected by a so-called cascade connection, and each additionally include an image transmitting unit 1000 and communication unit 1001 (to be described later). A PC 200 as a source device exists on the most upstream side, and the projectors 204a to 204d are connected in this order by cables 900a to 900c.

The PC 200 is identical to that of the first embodiment. The PC 200 is connected to the projector 204a (to be described later) by a cable 201 identical to that of the first embodiment.

The projector 204a is connected to the projector 204b by the cable 900a. The projector 204b is connected to the projector 204c by the cable 900b. The projector 204c is connected to the projector 204d by the cable 900c.

In this system, the PC 200 outputs, for example, the image signal shown in FIG. 3E. This image signal is first input to the projector 204a, and the projector 204a outputs the same image to the projector 204b. The same image signal is transmitted down to the projector 204d by thus sequentially repeating input and output. Each of the projectors 204a to 204d cuts out a corresponding portion from the received image signal, and projects the corresponding portion. Each projector also performs an edge blend process on the image to be projected.

As explained earlier with reference to FIGS. 3A to 3E, the four projectors can display an oblong image generated by the PC 200 as a single image.

<Apparatus Configuration> Next, the arrangements of the PC, a distributor, and the projector constructing the multi projection system will be explained with reference to FIG. 10.

The arrangement of the PC 200 is the same as that of the first embodiment, so an explanation thereof will be omitted.

The projectors 204a to 204d have the same arrangement, so they will collectively be explained as a projector 204.

As shown in FIG. 10, the projector 204 has the image transmitting unit 1000 and communication unit 1001 connected by a bus 510, in addition to the arrangement of the first embodiment.

A control unit 516 operates in accordance with flowcharts to be described later with reference to FIGS. 11A and 11B.

Unlike in the first embodiment, an image receiving unit 511 receives image data from a cascaded upstream device. The image receiving unit 511 transmits the received image data to the image transmitting unit 1000. In addition, the image receiving unit 511 converts the image data into a format suitable for internal processing, and outputs the converted data to an image cutting unit 513.

Unlike in the first embodiment, a communication unit 512 communicates with the cascaded upstream device. The communication unit 512 includes a storage unit 518 for storing EDID as in the first embodiment.

The communication unit 1001 communicates with a cascaded downstream device.

Each of the communication units 512 and 1001 receives information from the cascaded upstream or downstream device. An identifier specifying a transmission destination is added to this information. This identifier will be described later. If the identifier of the transmission destination of the information is the same as the identifier (to be described later) of its own device, the communication unit accepts the information; if not, the communication unit transfers the information. A practical transfer method is as follows. If the information is transmitted to the communication unit 512, the information is directly transmitted from the communication unit 1001 to an external device. If the information is transmitted to the communication unit 1001, the information is directly transmitted to the communication unit 512. Thus, communication can be performed by designating a partner device in the multi projection system in which the plurality of projectors are cascaded.

Also, if a special identifier for broadcasting is added to the information received by the communication unit 512 or 1001, the communication unit accepts the information to which the identifier is added, regardless of the identifier of its own device, and also transfers the information to another device. Thus, communication can be performed for all other devices in the multi projection system in which the plurality of projectors are cascaded.

The image cutting unit 513, a darkening processor 514, a projection display unit 515, and an operation unit 517 are identical to those of the first embodiment, so an explanation thereof will be omitted.

<Explanation of Operations> The operations of the PC 200, a distributor 202, and the projectors 204a to 204d will now be explained with reference to FIGS. 11A and 11B.

Figure 11A:
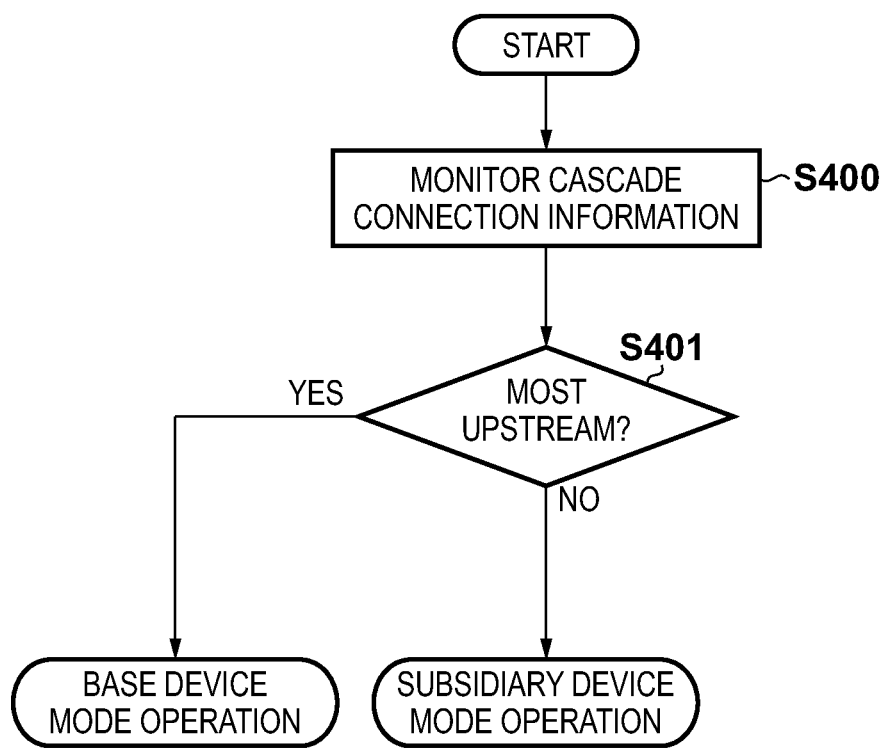
FIGS. 11A and 11B are flowcharts showing the operation of the projector of the second embodiment.

FIG. 11A shows the basic operation of the projectors 204a to 204d. FIG. 11B shows the operation of the projectors 204a to 204d in a base device mode.

Note that the operation of the PC 200 is the same as that in the first embodiment, so an explanation thereof will be omitted.

Note also that the projectors 204a to 204d equally operate, and hence will collectively be explained as a projector 204.

(Basic Operation) Referring to FIG. 11A, when the user instructs the projector 204 to turn on the power supply from the operation unit 517, the control unit 516 instructs a power supply unit (not shown) to supply power to each unit in step S400. Also, the control unit 516 reads out initial EDID pre-stored in a ROM (not shown), and writes the readout EDID in the storage unit 518. Then, the control unit 516 monitors cascade connection information. More specifically, the control unit 516 performs the following processing.

First, if the control unit 516 determines that a downstream device is connected to the communication unit 1001 (or if the power supply of the connected downstream device is turned on), the control unit 516 transmits the identifier, which is unique to its own device and stored in the ROM (not shown), to the downstream device. On the other hand, if an upstream device connected to the communication unit 512 transmits the identifier of the device, the communication unit 1001 transmits the identifier to the downstream device connected to the communication unit 1001.

If the downstream device is unconnected to the communication unit 1001, the control unit 516 stores the received identifier in the RAM of its own device. When the downstream device is connected to the communication unit 1001 (or when the power supply of the connected downstream device is turned on), the control unit 516 transmits the identifier of its own device and the identifier of the upstream device, which is stored in the RAM, to the downstream device connected to the communication unit 1001. Consequently, no identifier of any other projector is transmitted to the (most upstream) projector closest to the PC 200 as an upstream device, and the identifiers of all other projectors are transmitted to the (most downstream) projector farthest from the PC 200.

Figure 12:
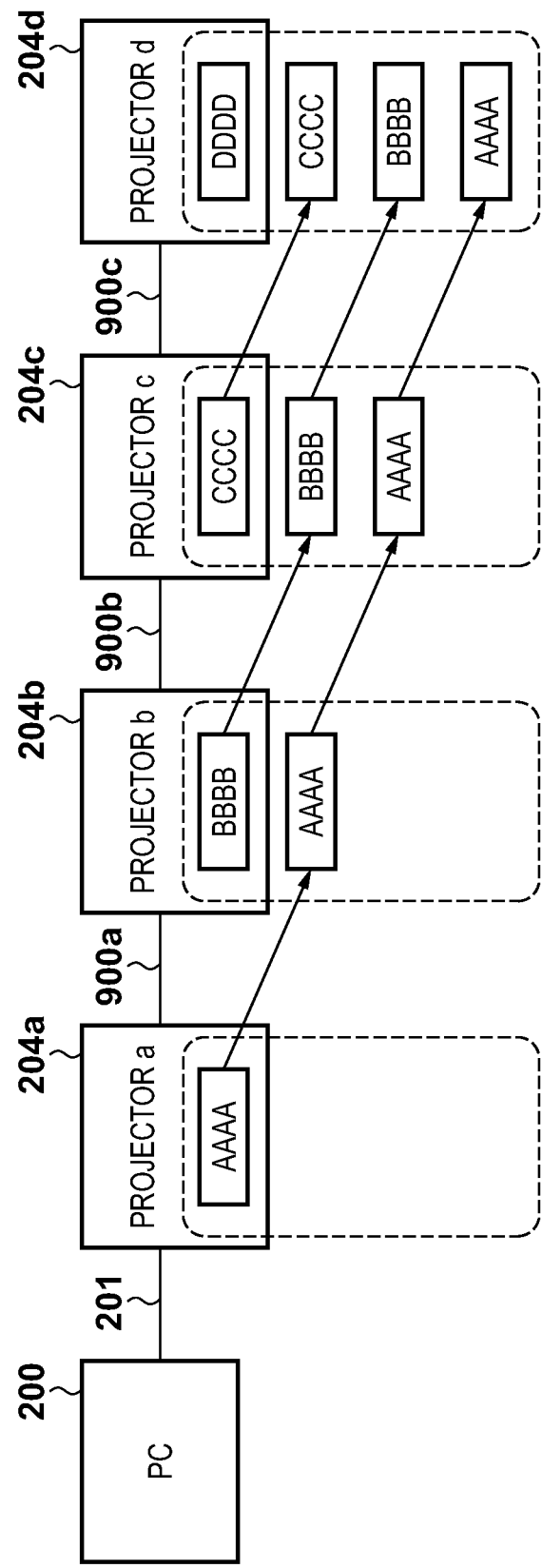
FIG. 12 is a view for explaining an identifier transmission method of the second embodiment.

A transmission example of the identifier in the arrangement shown in FIG. 9 will be explained with reference to FIG. 12. Assume that identifiers AAAA, BBBB, CCCC, and DDDD are respectively stored in the ROMs of the projectors 204a, 204b, 204c, and 204d. In this state, no identifiers are transmitted from the projectors 204b to 204d to the projector 204a. Identifier AAAA of the projector 204a is transmitted to the projector 204b. Identifier AAAA of the projector 204a and identifier BBBB of the projector 204b are transmitted to the projector 204c. Identifier AAAA of the projector 204a, identifier BBBB of the projector 204b, and identifier CCCC of the projector 204c are transmitted to the projector 204d.

Consequently, control units 516a, 516b, 516c, and 516d respectively hold lists (AAAA), (BBBB, AAAA), (CCCC, BBBB, AAAA), and (DDDD, CCCC, BBBB, AAAA). Thus, each of the controllers 516a to 516d of the projectors 204a to 204d can find the identifier of the base device by referring to the last element in the list.

Then, in step S401, the control unit 516 determines whether its own device is positioned on the most upstream side in the cascade connection shown in FIG. 9. This determination method has been described above. If the projector is positioned on the most upstream side in the cascade arrangement, the projector operates in a base device mode; if not, the projector operates in a subsidiary device mode. In the example shown in FIG. 9, the projector 204a operates in the base device mode, and the projectors 204b to 204d operate in the subsidiary device mode.

In the subsidiary device mode, the projector 204 performs the operation explained with reference to FIG. 6C except the following point. The cut position designation transmitted during event monitoring in step S301 is transmitted not from the distributor 202 of the first embodiment but from the base device. The multi projection information in step S307 is transmitted not to the distributor 202 of the first embodiment but to the base device.

(Operation in Base Device Mode)

Figure 11B:
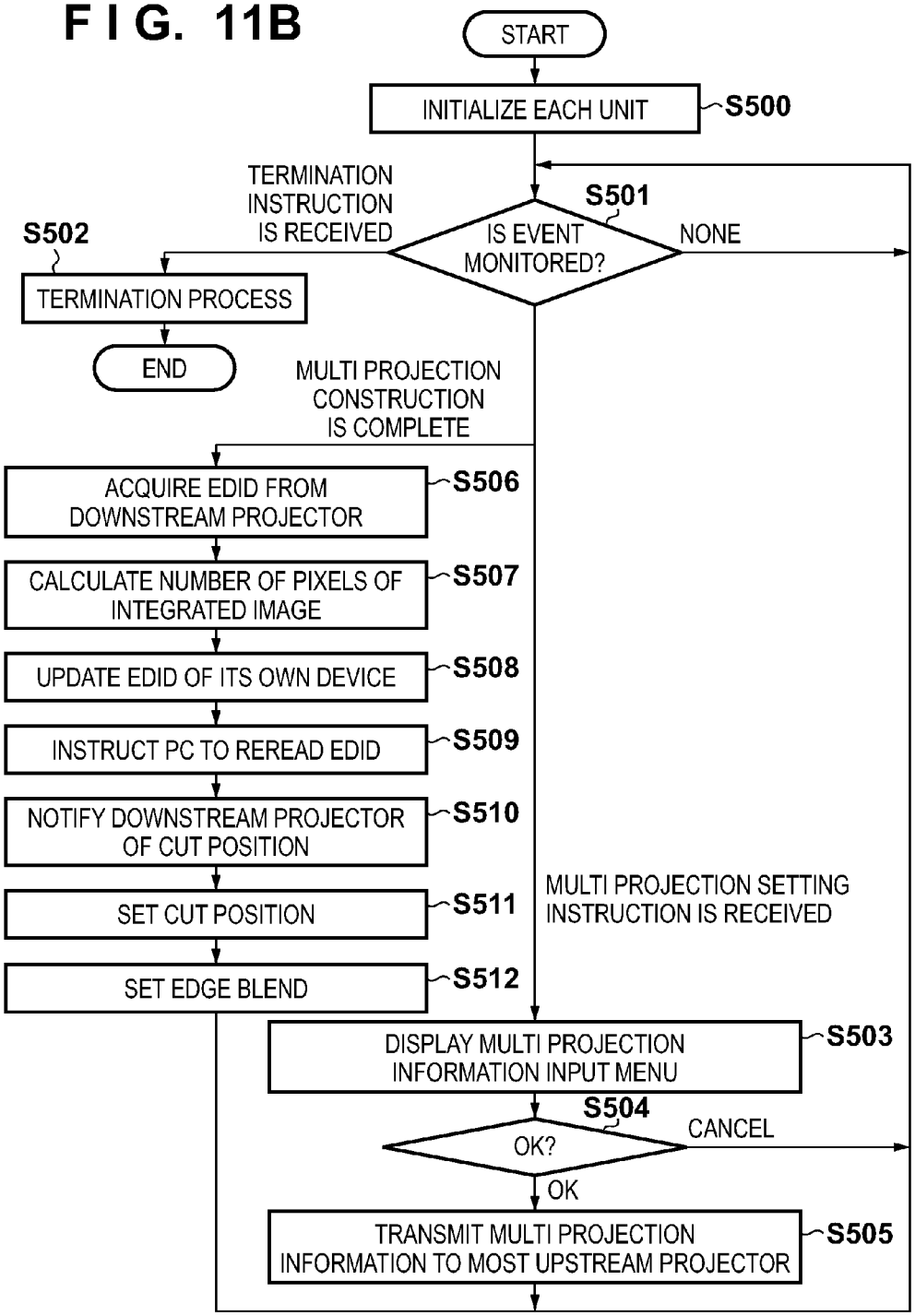

When activated in the base device mode in FIG. 11B, the control unit 516 first initializes each block in step S500. More specifically, the controller 516 instructs the power supply unit (not shown) to supply power to each unit. Also, the control unit 516 instructs the power supply unit to supply power to a lamp (not shown), and the projector 204 starts projecting an input image. Note that if there is no input image signal, the control unit 516 instructs a liquid crystal driving circuit (not shown) to display a blueback image, or display a warning indicating the absence of an input signal.

Then, in step S501, the control unit 516 waits until an event occurs from one of the units of the projector 204. If the control unit 516 determines that the user has instructed the projector 204 to turn off the power supply from the operation unit 517, the process advances to step S502. Also, if multi projection information is received from all downstream projectors in the subsidiary device mode via the communication unit 1001, the control unit 516 determines that a multi projection system is constructed, and the process advances to step S506. Furthermore, if the user designates multi projection setting from the operation unit 517, the process advances to step S503. Note that the multi projection information is the same as that explained with reference to FIGS. 7A and 7B in the first embodiment, so an explanation thereof will be omitted.

If the control unit 516 is instructed to turn off the power supply in step S501, the control unit 516 performs a process of terminating the projector 204 in step S502. Since details of the process are the same as in step S302 of the first embodiment, an explanation thereof will be omitted.

If the control unit 516 is instructed to perform multi projection setting in step S501, the process advances to step S503, and the control unit 516 accepts multi projection detail information input from the user. Since details of the process are the same as those in step S305 of the first embodiment, an explanation thereof will be omitted.

If the control unit 516 determines in step S504 that the user has selected the cancel button 810, the process returns to step S501. If the control unit 516 determines in step S504 that the user has selected the OK button 809, the process advances to step S505. After the determination in step S504, the display of the menu image 800 is erased regardless of the selected button.

In step S505, the control unit 516 changes the multi projection setting information input by the user in step S503 into the format shown in FIG. 7A, and stores the format in the RAM (not shown). After that, the process returns to step S501.

If the control unit 516 determines in step S501 that the multi projection system is constructed, the process advances to step S506, and the control unit 516 acquires EDID from all the downstream projectors via the communication unit 1001. This step is performed using broadcast communication. In addition, the control unit 516 reads out the EDID of its own projector, which is stored in the ROM (not shown). Consequently, it is possible to acquire the EDID of all the projectors, and acquire an optimum number of pixels of an input image of each projector.

In step S507, the control unit 516 calculates the number of pixels of an integrated image from the optimum number of pixels of each projector 204 obtained in step S506, and the multi projection information of each projector 204 received in step S501. Since this calculation method is the same as that explained in step S104 of the first embodiment, an explanation thereof will be omitted.

In step S508, the control unit 516 overwrites the number of pixels of the integrated image calculated in step S507, on the information of the optimum number of pixels of the device contained in the EDID stored in the storage unit 518, and writes the EDID in the storage unit 518 again.

In step S509, the control unit 516 instructs the PC 200 to read out the EDID again by using the communication unit 512. In response to this instruction, the PC 200 inputs an image signal corresponding to the number of pixels of the integrated image, as explained in the first embodiment. The input image signal is transmitted to the projectors 204a to 204d in the output stage via the image transmitting unit 1000 as described previously.

In step S510, the control unit 516 calculates portions corresponding to the projections 204a to 204d in the integrated image by using the multi projection information shown in FIG. 7A, and notifies the downstream projectors of the results. More specifically, as shown in FIG. 3E, the control unit 516 notifies the projector 204b of upper left coordinates (824,0)—lower right coordinates (1847, 767) of the integrated image(integrated projection screen), the projector 204c of upper left coordinates (1648,0)—lower right coordinates (2671, 767) of the integrated image(integrated projection screen), and the projector 204d of upper left coordinates (2472,0)—lower right coordinates (3495, 767) of the integrated image(integrated projection screen).

In step S511, the control unit 516 sets the corresponding region of its own device (the projector 204a) calculated in step S510 in the image cutting unit 513. For example, the control unit 516 sets upper left coordinates (0,0)—lower right coordinates (1023, 767) of the integrated image (integrated projection screen).

In step S512, the control unit 516 instructs the darkening processor 514 to perform an edge blend process based on the multi projection information input by the user as described previously. Consequently, the edge blend process is performed on the cutout image, and then the image is projected. After that, the process returns to step S501.

In this embodiment as has been explained above, an upstream projector can acquire the number-of-pixel information and the multi projection information set by the user from a downstream projector. In addition, based on these pieces of information, the upstream projector can calculate the number of pixels of an integrated image, reflect the calculation result on EDID, and notify the PC as a source device of the EDID. Therefore, the PC 200 can generate a virtual desktop screen by using the number of pixels of the integrated image, and input an image signal to the most upstream projector. Also, the input image signal is transmitted to cascaded downstream projectors. Each upstream projector can notify each downstream projector of that portion of the image signal, which corresponds to the upstream projector.

In the multi projection system of this embodiment, therefore, even when the setting of the multi projection information such as the layout position or edge blend width is changed, the number of pixels of an output image signal from the PC 200 can follow the change. Accordingly, an integrated image can be generated and displayed (by the number of pixels of the light valve) without performing any scaling in the projectors 204a to 204d.

As described above, in a projection system that performs edge blend, a source device is notified of the number of pixels of an integrated image by taking account of the number of pixels of a superposed region, and an image requiring no scaling is input. This makes it possible to suppress the deterioration of the image quality.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-265053, filed Dec. 2, 2011 which is hereby incorporated by reference herein in its entirety.

What is claimed is:

1. An information processing apparatus comprising:
    a communication unit that transmits information indicating a number of pixels of a predetermined image to an external image supply apparatus, wherein the predetermined image corresponds to an image to be displayed on a screen by overlapping a portion of a first image displayed by a first display apparatus and a portion of a second image displayed by a second display apparatus;
    a first transmitting unit that transmits at least a portion of an image that includes the first image, to the first display apparatus, after the information is transmitted to the external image supply apparatus, wherein the at least a portion of an image that includes the first image is generated based on a received image, and the received image is received from the external image supply apparatus after the information is transmitted to the external image supply apparatus; and
    a second transmitting unit that transmits at least a portion of an image that includes the second image, to the second display apparatus, after the information is transmitted to the external image supply apparatus, wherein the at least a portion of an image that includes the second image is generated based on the received image.

2. The information processing apparatus according to claim 1,
    wherein the information is determined based on a number of pixels of a region, the number of pixels of the region is different from the number of pixels of the predetermined image, and the region is a region that a portion of the first image and a portion of the second image are overlapped.

3. The information processing apparatus according to claim 1, wherein the communication unit transmits an instruction for causing the external image supply apparatus to read the information to the external image supply apparatus.

4. The information processing apparatus according to claim 1, wherein the information is determined based on information indicating a region and a number of pixels of the region, the number of pixels of the region is different from the number of pixels of the predetermined image, and the region is a region that a portion of the first image and a portion of the second image are overlapped.

5. The information processing apparatus according to claim 1, wherein the communication unit transmits the information to the external image supply apparatus after display information relating to a display of the predetermined image is received.

6. The information processing apparatus according to claim 1, wherein the communication unit transmits the information to the external image supply apparatus after display information relating to a display of the predetermined image is changed.

7. The information processing apparatus according to claim 1, wherein the communication unit transmits the information to the external image supply apparatus such that the external image supply apparatus generates an image based on the information.

8. A method comprising:
   transmitting information indicating a number of pixels of a predetermined image to an external image supply apparatus, wherein the predetermined image corresponds to an image to be displayed on a screen by overlapping a portion of a first image displayed by a first display apparatus and a portion of a second image displayed by a second display apparatus;
   transmitting at least a portion of an image that includes the first image, to the first display apparatus, after the information is transmitted to the external image supply apparatus, wherein the at least a portion of an image that includes the first image is generated based on a received image, and the received image is received from the external image supply apparatus after the information is transmitted to the external image supply apparatus; and
   transmitting at least a portion of an image that includes the second image, to the second display apparatus, after the information is transmitted to the external image supply apparatus, wherein the at least a portion of an image that includes the second image is generated based on the received image.

9. The method according to claim 8, wherein the information is determined based on a number of pixels of a region, the number of pixels of the region is different from the number of pixels of the predetermined image, and the region is a region that a portion of the first image and a portion of the second image are overlapped.

10. The method according to claim 8, wherein the information is determined based on information indicating a region and a number of pixels of the region, the number of pixels of the region is different from the number of pixels of the predetermined image, and the region is a region that a portion of the first image and a portion of the second image are overlapped.

11. The method according to claim 8, further comprising transmitting the information to the external image supply apparatus after display information relating to a display of the predetermined image is received.

12. The method according to claim 8, further comprising transmitting the information to the external image supply apparatus after display information relating to a display of the predetermined image is changed.

13. An information processing apparatus comprising:
   a display unit that displays an image;
   a communication unit that transmits information indicating a number of pixels of a predetermined image to an external image supply apparatus, wherein the predetermined image corresponds to an image to be displayed on a screen by overlapping a first image displayed by the display unit and a second image displayed by an external display apparatus;
   a transmitting unit that transmits at least a portion of an image that includes the second image, to the external display apparatus, after the information is transmitted to the external image supply apparatus, wherein the at least a portion of an image that includes the second image is generated based on a received image, and the received image is received from the external image supply apparatus after the information is transmitted to the external image supply apparatus; and
   a control unit that performs a process for causing the display unit to display at least a portion of an image that includes the first image, wherein the at least a portion of an image that includes the first image is generated based on the received image.

14. The information processing apparatus according to claim 13, wherein the information is determined based on a number of pixels of a region, the number of pixels of the region is different from the number of pixels of the predetermined image, and the region is a region that a portion of the first image and a portion of the second image are overlapped.

15. The information processing apparatus according to claim 13, wherein the communication unit transmits an instruction for causing the external image supply apparatus to read the information to the external image supply apparatus.

16. The information processing apparatus according to claim 13, wherein the information is determined based on information indicating a region and a number of pixels of the region, the number of pixels of the region is different form the number of pixels of the predetermined image, and the region is a region that a portion of the first image and a portion of the second image are overlapped.

17. The information processing apparatus according to claim 13, wherein the communication unit transmits the information to the external image supply apparatus after display information relating to a display of the predetermined image is received.

18. The information processing apparatus according to claim 13, wherein the communication unit transmits the information to the external image supply apparatus after display information relating to a display of the predetermined image is changed.

19. The information processing apparatus according to claim 13, wherein the communication unit transmits the information to the external image supply apparatus such that the external image supply apparatus generates an image based on the information.

20. A method comprising:
   transmitting information indicating a number of pixels of a predetermined image to an external image supply apparatus, wherein the predetermined image corresponds to an image to be displayed on a screen by overlapping a portion of a first image displayed by a display unit and a portion of a second image displayed by an external display apparatus;
   transmitting at least a portion of an image that includes the second image, to the external display apparatus, after the information is transmitted to the external image supply apparatus, wherein the at least a portion of an image that includes the second image is generated based on a received image, and the received image is received from the external image supply apparatus after the information is transmitted to the external image supply apparatus; and performing a process for causing the display unit to display at least a portion of an image that includes the first image, wherein the at least a portion of an image that includes the first image is generated based on the received image.

21. The method according to claim 20, wherein the information is determined based on a number of pixels of a region, the number of pixels of the region is different from the number of pixels of the predetermined image, and the region is a region that a portion of the first image and a portion of the second image are overlapped.

22. The method according to claim 20, wherein the information is determined based on information indicating a region and a number of pixels of the region, the number of pixels of the region is different from the number of pixels of the predetermined image, and the region is a region that a portion of the first image and a portion of the second image are overlapped.

23. The method according to claim 20, further comprising transmitting the information to the external image supply apparatus after display information relating to a display of the predetermined image is received.

24. The method according to claim 20, further comprising transmitting the information to the external image supply apparatus after display information relating to a display of the predetermined image is changed.

* * * * *